US010927765B2

(12) United States Patent
Yoshida et al.

(10) Patent No.: US 10,927,765 B2
(45) Date of Patent: Feb. 23, 2021

(54) SEAL SEGMENT AND ROTARY MACHINE (71) Applicant: Mitsubishi Hitachi Power Systems, Ltd., Yokohama (JP)

(72) Inventors: Azumi Yoshida, Tokyo (JP); Hidekazu Uehara, Tokyo (JP); Shin Nishimoto, Yokohama (JP); Naoya Tatsumi, Yokohama (JP); Kohei Ozaki, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 133 days.

(21) Appl. No.: 16/097,982

(22) PCT Filed: Apr. 19, 2017

(86) PCT No.: PCT/JP2017/015738
§ 371 (c)(1),
(2) Date: Oct. 31, 2018

(87) PCT Pub. No.: WO2017/195550
PCT Pub. Date: Nov. 16, 2017

(65) Prior Publication Data
US 2019/0145320 A1 May 16, 2019

(30) Foreign Application Priority Data

May 9, 2016 (JP) .............................. JP2016-093904

(51) Int. Cl.
*F02C 7/28* (2006.01)
*F16J 15/3292* (2016.01)
(Continued)

(52) U.S. Cl.
CPC ................ *F02C 7/28* (2013.01); *F01D 11/00* (2013.01); *F01D 25/00* (2013.01); *F04D 29/106* (2013.01);
(Continued)

(58) Field of Classification Search
CPC .......... F05B 2240/572; F05B 2240/571; F01D 11/001; F01D 11/00; F16J 15/3292;
(Continued)

(56) References Cited

U.S. PATENT DOCUMENTS 5,755,445 A 5/1998 Arora
6,343,792 B1 2/2002 Shinohara et al.
(Continued)

FOREIGN PATENT DOCUMENTS

CN 103184902 A 7/2013
CN 103842695 A 6/2014
(Continued)

OTHER PUBLICATIONS

International Search Report dated Aug. 1, 2017, issued in counterpart application No. PCT/JP2017/015738, with English translation. (4 pages).
(Continued)

*Primary Examiner* — Eugene G Byrd
(74) *Attorney, Agent, or Firm* — Westerman, Hattori, Daniels & Adrian, LLP (57) ABSTRACT A seal segment (11) includes a seal body having a plurality of laminated thin plate seal pieces (20), and a high-pressure side plate (23). The high-pressure side plate (23) includes an outer diameter side edge portion (23b) which is an outer edge portion in the radial direction (Dr) and extends in a circular arc shape in the circumferential direction (Dc), an inner diameter side edge portion (23c) which is an inner edge portion in a radial direction (Dr) and extends in a circular arc shape in the circumferential direction (Dc), and a front edge portion (23d) which is an edge portion on a front side in the rotational direction (Bc). The high-pressure side plate (23) further includes a reinforcing portion (40) only in
(Continued)

a region of the high-pressure side plate (23) on the front side in the rotational direction (Bc).

16 Claims, 8 Drawing Sheets

(51) Int. Cl.
| | | |
|---|---|---|
| *F16J 15/22* | (2006.01) | |
| *F01D 11/00* | (2006.01) | |
| *F16J 15/44* | (2006.01) | |
| *F01D 25/00* | (2006.01) | |
| *F04D 29/10* | (2006.01) | |
| *F16J 15/54* | (2006.01) | |

(52) U.S. Cl.
CPC .......... *F16J 15/22* (2013.01); *F16J 15/3292* (2013.01); *F16J 15/44* (2013.01); *F16J 15/54* (2013.01)

(58) Field of Classification Search
CPC .... F16J 15/3288; F16J 15/54; F05D 2240/57; F05D 2240/59; F02C 7/28
See application file for complete search history.

(56) References Cited

U.S. PATENT DOCUMENTS

| | | | | |
|---|---|---|---|---|
| 6,874,788 B2* | 4/2005 | Kono | ............... | F16J 15/3292 277/355 |
| 7,226,053 B2* | 6/2007 | Nakano | ............... | F16J 15/4472 277/355 |
| 7,261,515 B2* | 8/2007 | Nishimoto | ........... | F16J 15/3292 277/355 |
| 7,413,194 B2* | 8/2008 | Wright | ............... | F16J 15/3288 277/355 |
| 7,828,297 B2* | 11/2010 | Hoebel | ............... | F16J 15/3292 277/355 |
| 8,025,296 B2* | 9/2011 | Uehara | ............... | F01D 11/00 277/355 |
| 8,100,406 B2 | 1/2012 | Wright | | |
| 8,152,462 B1* | 4/2012 | Williams | ........... | F16J 15/3292 277/355 |
| 8,220,802 B2* | 7/2012 | Rhodes | ............... | F16J 15/3292 277/412 |
| 8,250,756 B2* | 8/2012 | Adis | ................... | F16J 15/3292 277/355 |
| 8,262,349 B2* | 9/2012 | Turnquist | ............. | F01D 11/025 277/412 |
| 8,382,120 B2* | 2/2013 | Deo | ...................... | F01D 11/02 277/355 |
| 8,474,827 B2* | 7/2013 | Grondahl | ............. | F01D 11/02 277/411 |
| 9,103,223 B2 | 8/2015 | Uehara et al. | | |
| 2002/0105146 A1* | 8/2002 | Uehara | ............... | F16J 15/3292 277/355 |
| 2003/0068224 A1* | 4/2003 | Uehara | ............... | F16J 15/3292 415/170.1 |
| 2004/0256810 A1* | 12/2004 | Nakano | ............... | F16J 15/3292 277/402 |
| 2008/0042366 A1* | 2/2008 | Awtar | ................. | F01D 11/003 277/411 |
| 2008/0048399 A1* | 2/2008 | Nicholson | ........... | F01D 11/001 277/355 |
| 2008/0265514 A1* | 10/2008 | Mortzheim | ........... | F01D 11/00 277/303 |
| 2008/0309018 A1 | 12/2008 | Williams | | |
| 2009/0309311 A1* | 12/2009 | Verma | ................. | F16J 15/3292 277/411 |
| 2010/0024592 A1* | 2/2010 | Maurin-Perrier | .......................... | B23K 26/0624 74/640 |
| 2010/0247309 A1* | 9/2010 | Ambrosy | ............. | F01D 11/001 415/230 |
| 2011/0148046 A1* | 6/2011 | Jahn | ..................... | F16J 15/3292 277/412 |
| 2011/0316237 A1* | 12/2011 | Uehara | ............... | F01D 11/001 277/413 |
| 2012/0261884 A1* | 10/2012 | Uehara | ............... | F16J 15/3292 277/411 |
| 2013/0170965 A1 | 7/2013 | Rao et al. | | |
| 2013/0181412 A1* | 7/2013 | Shinohara | ........... | F16J 15/3292 277/500 |
| 2013/0200569 A1 | 8/2013 | Franceschini | | |
| 2014/0241877 A1 | 8/2014 | Uehara et al. | | |
| 2015/0300190 A1 | 10/2015 | Matsumoto et al. | | |
| 2015/0345640 A1 | 12/2015 | Inoue | | |
| 2015/0361815 A1 | 12/2015 | Aksit | | |

FOREIGN PATENT DOCUMENTS

| | | | | |
|---|---|---|---|---|
| CN | 104583650 A | | 4/2015 | |
| CN | 104736906 A | | 6/2015 | |
| CN | 105317470 A | | 2/2016 | |
| JP | 2003343730 A | * | 12/2003 | |
| JP | 3692300 B2 | | 9/2005 | |
| JP | 2008-261498 A | | 10/2008 | |
| JP | 2009-281437 A | | 12/2009 | |
| JP | 2013-92205 A | | 5/2013 | |
| JP | 2013092205 A | * | 5/2013 | ............ F01D 11/001 |
| JP | 2013249844 A | * | 12/2013 | ............ F01D 11/02 |
| WO | 2013/062040 A1 | | 5/2013 | |

OTHER PUBLICATIONS

Written Opinion dated Aug. 1, 2018, issued in counterpart application No. PCT/JP2017/015738, with English translation. (8 pages).

\* cited by examiner

SEAL SEGMENT AND ROTARY MACHINE

TECHNICAL FIELD

The present invention relates to a seal segment and a rotary machine.

Priority is claimed on Japanese Patent Application No. 2016-093904, filed May 9, 2016, the content of which is incorporated herein by reference.

BACKGROUND ART

Around a rotor in a rotary machine such as a gas turbine and a steam turbine, a shaft seal device is provided to reduce a leakage amount of a working fluid flowing from a high-pressure side to a low-pressure side. As an example of this shaft seal device, for example, a shaft seal device described in the following Patent Document 1 is known.

The shaft seal device includes a housing provided in a stator, and a seal body made up of a plurality of thin plate seal pieces, and a high-pressure side plate and a low-pressure side plate which are divided into a plurality of plates in a circumferential direction of the rotor and provided to extend along the high-pressure side and the low-pressure side of the seal body. Further, the low-pressure side plate and the high-pressure side plate restrict the flow of the working fluid to small gaps of the thin plate seal pieces.

CITATION LIST

Patent Literature

[Patent Document 1]
International Publication No. WO2013/062040

SUMMARY OF INVENTION

Technical Problem

Incidentally, in a rotary machine, a swirling flow may occur in a rotational direction. When applying the aforementioned shaft seal device to such a part in which a speed of the swirling flow is high, due to the swirling flow on a fluid high-pressure region side and the non-uniform flow in the vicinity of a divided portion of the high-pressure side plate and the low-pressure side plate, a pressure fluctuation occurs at the high-pressure side plate. As a result, fluttering may occur in the high-pressure side plate.

In contrast, in the shaft seal device described in Patent Document 1, a rigidity imparting means is provided on the high-pressure side plate to suppress fluttering. However, when the rigidity imparting means is provided on the high-pressure side plate, since contact of the high-pressure side plate with a side surface of the seal body is hindered, there is a possibility that the shaft seal device described in Patent Document 1 affects sealing characteristics.

The present invention provides a seal segment and a rotary machine which hardly affect the sealing characteristics and can suppress fluttering.

Solution to Problem

A seal segment according to a first aspect includes a seal body having a plurality of thin plate seal pieces which extend forward in a rotational direction of a rotary shaft toward an inner side of the rotary shaft in the radial direction and are laminated in a partial region of the rotary shaft in a circumferential direction; and a high-pressure side plate extending in the circumferential direction to cover the seal body from a high-pressure side of the rotary shaft in an axial direction.

The high-pressure side plate includes an outer diameter side edge portion which is an outer edge portion in the radial direction and extends in a circular arc shape in the circumferential direction, an inner diameter side edge portion which is an inner edge portion in the radial direction and extends in a circular arc shape in the circumferential direction, and a front edge portion which is an edge portion on a front side in the rotational direction, extends to the front side in the rotational direction from the outer diameter side edge portion toward the inner side in the radial direction and is connected to the inner diameter side edge portion.

The high-pressure side plate further includes a reinforcing portion only in a region of the high-pressure side plate on the front side in the rotational direction.

In this aspect, since rigidity is reinforced only in the region of the high-pressure side plate on the front side in the rotational direction of the high-pressure side plate where fluttering easily occurs, the seal segment can maintain the sealing performance of the thin plate seal piece.

Therefore, the seal segments hardly affect sealing characteristics and can suppress fluttering.

According to the seal segment of a second aspect in the first aspect, when a line segment extending from an end portion of the outer diameter side edge portion on the front side in the rotational direction toward the inner diameter side edge portion in the radial direction is defined as a boundary line, the reinforcing portion is provided to extend rearward in the rotational direction from the front edge portion side and straddle the boundary line.

In this aspect, the reinforcing portion reinforces at least a portion of the high-pressure side plate on a front side in a rotational direction from a boundary line where fluttering easily occurs.

According to the seal segment of a third aspect in the second aspect, the reinforcing portion includes a thick plate portion provided to extend rearward in the rotational direction from the front edge portion side and straddle the boundary line, only in a region of the high-pressure side plate on the front side in the rotational direction.

In this aspect, since rigidity can be adjusted by the thickness and the area of the thick plate portion, the rigidity of the reinforcing portion can be easily adjusted.

According to the seal segment of a fourth aspect in the second or third aspect, the reinforcing portion includes a rib structure provided to extend rearward in the rotational direction from the front edge portion side and straddle the boundary line, only in a region of the high-pressure side plate on the front side in the rotational direction.

In this aspect, the rigidity of the reinforcing portion can be increased even after processing of the high-pressure side plate.

A seal segment according to a fifth aspect includes a seal body having a plurality of thin plate seal pieces which extend forward in a rotational direction of a rotary shaft toward an inner side of the rotary shaft in the radial direction and are laminated in a partial region of the rotary shaft in a circumferential direction; and a high-pressure side plate extending in the circumferential direction to cover the seal body from a high-pressure side of the rotary shaft in an axial direction.

The high-pressure side plate includes an outer diameter side edge portion which is an outer edge portion in the radial direction and extends in a circular arc shape in the circumferential direction, an inner diameter side edge portion which is an inner edge portion in the radial direction and extends in a circular arc shape in the circumferential direction, and a front edge portion which is an edge portion on a front side in the rotational direction, extends to the front side in the rotational direction from the outer diameter side edge portion toward the inner side in the radial direction and is connected to the inner diameter side edge portion.

The high-pressure side plate further includes a bent plate portion only in a region of the high-pressure side plate on the front side in the rotational direction.

In this aspect, due to the reinforcement and restoring force of the bent plate portion of the high-pressure side plate, the seal segment can maintain the sealing performance of the thin plate seal piece. For this reason, the seal segments hardly affect sealing characteristics and can suppress fluttering.

According to the seal segment of a sixth aspect in the fifth aspect, when a line segment extending from an end portion of the outer diameter side edge portion on the front side in the rotational direction toward the inner diameter side edge portion in the radial direction is defined as a boundary line, the bent plate portion is bent to overlap each other from the front edge portion to the boundary line.

In this aspect, the bent plate portion reinforces at least a portion of the high-pressure side plate on a front side in a rotational direction from a boundary line where fluttering easily occurs.

The seal segment of a seventh aspect is the seal segment of the fifth or sixth aspect, wherein the bent plate portion is bent at the front edge portion.

In this aspect, the seal segment can form a thin bent plate portion, and can maintain the sealing performance of the thin plate seal piece. For this reason, the seal segments hardly affect sealing characteristics, and can suppress fluttering.

The rotary machine of an eighth aspect includes a seal segment of any one of the first to seventh aspects.

In this aspect, the sealing performance of the thin plate seal pieces in the seal segments of the rotary machine is maintained. Therefore, the seal segments hardly affect sealing characteristics, and fluttering is suppressed.

Advantageous Effects of Invention

The sealing segments and the rotary machine described above hardly affect sealing characteristics and fluttering can be suppressed.

DESCRIPTION OF EMBODIMENTS

Hereinafter, various embodiments of the present invention will be described with reference to the drawings.

First Embodiment

Hereinafter, the first embodiment of the present invention will be described in detail. In the present embodiment, an example in which a shaft seal device 10 is applied to a gas turbine (a rotary machine) 1 is shown.

Figure 1:
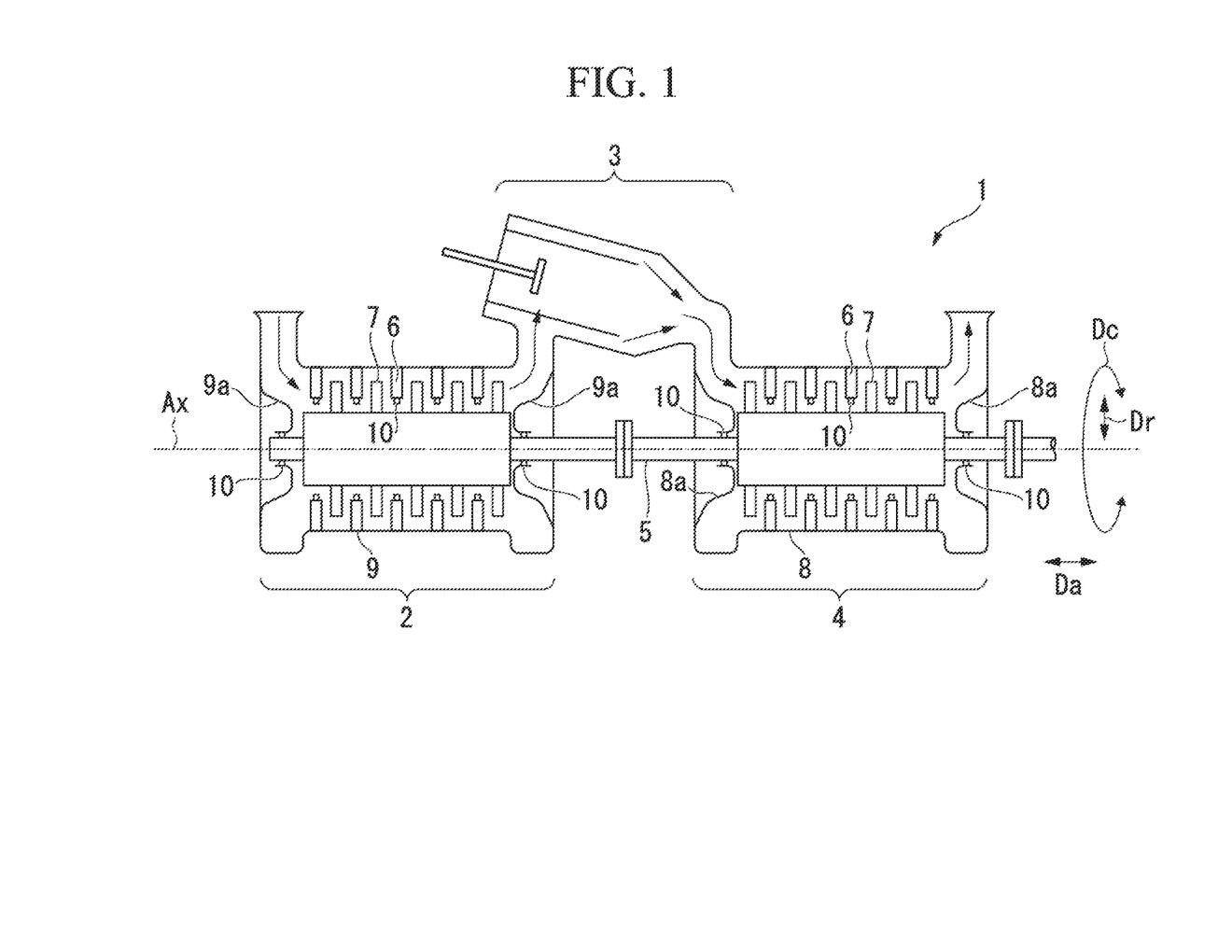
FIG. 1 is a schematic overall configuration diagram of a gas turbine (a rotary machine) according to a first embodiment of the present invention.

The gas turbine 1 shown in FIG. 1 has a compressor 2 that takes in and compresses a large amount of air, and a combustor 3 that mixes the fuel with the air compressed by the compressor 2 and combusts the mixture. The gas turbine 1 further has a rotating turbine 4, and a rotor 5 (rotary shaft) that transmits a part of the rotating power of the turbine 4 to the compressor 2 to rotate the compressor 2.

A combustion gas generated in the combustor 3 is introduced into the turbine 4, and thermal energy of the combustion gas is converted into rotational energy to rotate the turbine 4.

In the following description, a direction in which an axis Ax of the rotor 5 extends is defined as an "axial direction Da," a circumferential direction of the rotor 5 is defined as a "circumferential direction Dc," a radial direction of the rotor 5 is defined as a "radial direction Dr," and a rotational direction of the rotor 5 is defined as a "rotational direction Bc."

In the gas turbine 1 having the above-described configuration, the turbine 4 converts thermal energy of the combustion gas into mechanical rotational energy to generate power by blowing the combustion gas to the turbine blades 7 provided on the rotor 5. In addition to the plurality of turbine blades 7 on the rotor 5 side of the turbine 4, a plurality of turbine vanes 6 are provided on a casing 8 side of the turbine 4, and the turbine blades 7 and the turbine vanes 6 are alternately arranged in the axial direction Da.

The turbine blades 7 receive the pressure of the combustion gas flowing in the axial direction Da to rotate the rotor 5 around the axis, and the rotational energy applied to the rotor 5 is used by being taken out from a shaft end. Between the turbine vanes 6 and the rotor 5, the shaft seal device 10 is provided as a shaft seal for reducing the leakage amount of combustion gas leaking from the high-pressure side to the low-pressure side.

The compressor 2 is coaxially connected to the turbine 4 by the rotor 5, compresses outside air using the rotation of the turbine 4, and supplies the compressed air to the combustor 3. Like the turbine 4, in the compressor 2, a plurality of turbine blades 7 are provided on the rotor 5 and a plurality of turbine vanes 6 are provided on the casing 9 side of the compressor 2, and the turbine blades 7 and the turbine vanes 6 are alternately arranged in the axial direction Da. Furthermore, the shaft seal device 10 for reducing the leakage amount of compressed air leaking from the high-pressure side to the low-pressure side is also provided between the turbine vanes 6 and the rotor 5.

In addition, the shaft seal device 10 for preventing the compressed air or the combustion gas from leaking from the high-pressure side to the low-pressure side is also provided in a bearing portion 9a by which the casing 9 of the compressor 2 supports the rotor 5, and a bearing portion 8a by which the casing 8 of the turbine 4 supports the rotor 5.

Here, the shaft seal device 10 according to the present embodiment is not limited to application to the gas turbine 1. For example, the shaft seal device 10 can be widely adopted in general rotary machines that convert energy into work by rotation of a shaft and flow of a fluid, like a large-scale fluid machine such as a steam turbine, a compressor, a water wheel, a refrigerator or a pump. In this case, the shaft seal device 10 can also be widely used to suppress the flow of a fluid in the axial direction Da.

Figure 2:
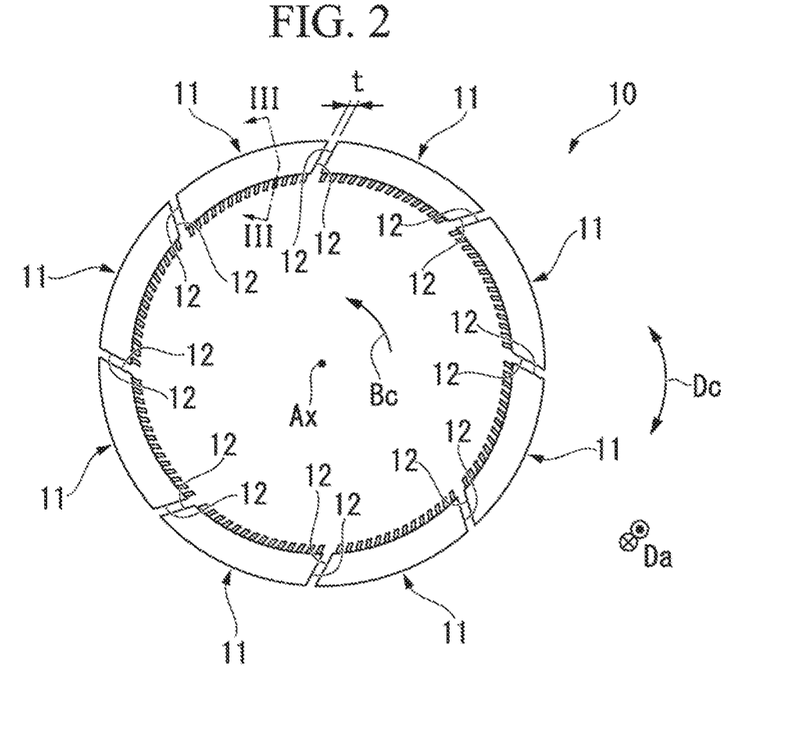
FIG. 2 is a schematic configuration diagram of a shaft seal device according to the first embodiment of the present invention.

Next, the configuration of the shaft seal device 10 provided in the gas turbine 1 configured as described above will be described with reference to the drawings. FIG. 2 is a diagram as seen from the axial direction Da. As shown in FIG. 2, the shaft seal device 10 includes a plurality of (eight in this embodiment) seal segments 11 extending in a circular arc shape. The plurality of seal segments 11 are annularly disposed in the circumferential direction Dc. A gap t is formed between the circumferential end portions 12 and 12 of the adjacent seal segments 11 disposed in this manner.

The configuration of each seal segment 11 will be described with reference to FIG. 3. A cut position of the cross section of the seal segment 11 shown in FIG. 3 corresponds to a position of the line I-I shown in the seal segment 11 of FIG. 2.

Each seal segment 11 is inserted into a housing (corresponding to the turbine vanes 6, the turbine blades 7 and the bearing portions 8a and 9a) 30 and installed to prevent leakage of a working fluid in the annular space between the rotor 5 and a housing 30.

The seal segment 11 includes a seal body 13, retainers 21 and 22, a high-pressure side plate 23, and a low-pressure side plate 24.

The seal body 13 includes a plurality of thin plate seal pieces 20 which are metallic members laminated in multiple layers at small intervals in the circumferential direction Dc. The plurality of thin plate seal pieces 20 are laminated in the circumferential direction Dc (the rotational direction Bc) in a partial region of the rotor 5 in the circumferential direction Dc, and have a circular arc band shape as a whole when viewed in the axial direction Da.

The retainers 21 and 22 are configured to sandwich the thin plate seal pieces 20 from both sides at outer circumferential side proximal ends 27 of the thin plate seal pieces 20. The cross-sections of the retainers 21 and 22 in the circumferential direction Dc are formed in substantially a C shape. Further, the cross-sections of the retainers 21 and 22 in the axial direction Da are formed in a circular arc band shape.

The high-pressure side plate 23 is sandwiched between an edge end on the high-pressure side facing the high-pressure side region of the thin plate seal piece 20 and the retainer 21. Therefore, the high-pressure side plate 23 extends in the radial direction Dr and the circumferential direction Dc to cover the high-pressure side surface of the plurality of thin plate seal pieces 20 from the high-pressure side in the axial direction Da.

The low-pressure side plate 24 is sandwiched between an edge end on the low-pressure side facing the low-pressure side region of the thin plate seal pieces 20 and the retainer 22. Therefore, the low-pressure side plate 24 extends in the radial direction Dr and the circumferential direction Dc to cover the low-pressure side surfaces of the plurality of thin plate seal pieces 20 from the low-pressure side in the axial direction Da.

In the seal body 13 configured as described above, the thin plate seal pieces 20 are made of thin steel plates having substantially T shapes in which a width (a width in the axial direction Da) on the inner circumferential side is smaller than a width (a width in the axial direction Da) of the outer circumferential side proximal end 27. At both side edges thereof notched portions 20a and 20b are formed at positions at which the width is small.

A plurality of adjacent thin plate seal pieces 20 are fixedly connected to each other at the outer circumferential side proximal end 27 by, for example, welding.

The thin plate seal pieces 20 have a predetermined rigidity based on the plate thickness in the circumferential direction Dc. Further, the thin plate seal pieces 20 are fixed to the retainers 21 and 22 so that an angle formed between the thin plate seal pieces 20 and the circumferential surface of the rotor 5 toward the rotational direction Bc is an acute angle.

Therefore, the thin plate seal pieces 20 extend toward the front side in the rotational direction Bc toward the inner side in the radial direction Dr.

In the seal segment 11 configured as described above, when the rotor 5 is stationary, the leading ends of the respective thin plate seal pieces 20 come into contact with the rotor 5. When the rotor 5 rotates, due to the dynamic pressure effect generated by the rotation of the rotor 5, the leading ends of the thin plate seal pieces 20 float from the outer periphery of the rotor 5 and come out of contact with the rotor 5. Therefore, in the seal segment 11, abrasion of each thin plate seal piece 20 is suppressed, and the life of the seal is prolonged.

The high-pressure side plate 23 has a fitting stepped portion 23a on the outer circumferential side. The width of the fitting stepped portion 23a in the axial direction Da is greater than the width of the high-pressure side plate 23 in the axial direction Da on the inner circumferential side.

The low-pressure side plate 24 has a fitting stepped portion 24a on the outer circumferential side. The width of the fitting stepped portion 24a in the axial direction Da is greater than the width of the low-pressure side plate 24 in the axial direction Da on the inner circumferential side.

The fitting stepped portions 23a and 24a are fitted into the notched portions 20a and 20b of the thin plate seal pieces 20, respectively.

Further, the retainer 21 has a recessed groove 21a on the surface facing one side edge (the side edge on the high-pressure side) of the outer circumferential side proximal end 27 of the plurality of thin plate seal pieces 20. The retainer 22 has a recessed groove 22a on the surface facing the other side edge (the side edge on the low-pressure side) of the outer circumferential side proximal end 27 of the plurality of thin plate seal pieces 20. The fitting stepped portion 23a of the high-pressure side plate 23 and the fitting stepped portion 24a of the low-pressure side plate 24 are fitted into the notched portions 20a and 20b, respectively. One side edge (the side edge on the high-pressure side) on the outer circumferential side of the plurality of thin plate seal pieces 20 fitted with the fitting stepped portion 23a and the fitting stepped portion 24a is fitted into the recessed groove 21a of the retainer 21. Further, the other side edge (the side edge on the low-pressure side) on the outer circumferential side thereof is fitted into the recessed groove 22a of the retainer 22. With such a configuration, the respective thin plate seal pieces 20 are fixed to the retainers 21 and 22.

An annular recessed groove 31 is formed in the inner circumferential wall surface of the housing 30. The annular recessed groove 31 has a shape in which a stepped portion is provided on the side surface facing one side edge (side edge on the high-pressure side) of the thin plate seal pieces 20 and the other side edge (the side edge on the low-pressure side) such that the width on the outer circumferential side is greater than the width on the inner circumferential side in the axial direction of the rotor 5. Further, the thin plate seal pieces 20, the retainers 21 and 22, the high-pressure side plate 23 and the low-pressure side plate 24 are fitted into the recessed groove 31 of the housing 30 such that surfaces facing the inner circumferential side of the retainers 21 and 22 is brought into contact with surfaces facing the outer circumferential side in the step. Inner circumferential side end portions 26 of the thin plate seal pieces 20 protrude toward the rotor 5 side from the high-pressure side plate 23. On the other hand, the inner circumferential side end portions 26 of the thin plate seal pieces 20 protrude toward the rotor 5 side from the low-pressure side plate 24, but a protruding amount thereof is set to be greater than that of the high-pressure side. That is, the thin plate seal pieces 20 are more greatly exposed to the working fluid G on the low-pressure side than on the high-pressure side. In other words, the high-pressure side plate 23 shields a wider range on the side surface of the thin plate seal pieces 20 from the working fluid G.

The high-pressure side plate 23 is brought into close contact with side surfaces 20c of the thin plate seal pieces 20 by the pressure caused by the flow of the working fluid G, thereby preventing the working fluid G from greatly flowing into the gaps between the plurality of thin plate seal pieces 20. Therefore, the high-pressure side plate 23 creates an upward flow from the inner circumferential side end portion 26 toward the outer circumferential side proximal end 27 in the gap portion between the plurality of thin plate seal pieces 20, thereby causing the inner circumferential side end portion 26 of the thin plate seal pieces 20 to float by the fluid force and come out of contact.

Further, the low-pressure side plate 24 is pushed by the high-pressure side plate 23 and the thin plate seal pieces 20 to come into close contact with a low-pressure side wall surface 32 of the inner circumferential wall surface of the housing 30. Since an inner diameter of the low-pressure side plate 24 is greater than that of the high-pressure side plate 23, the flow in the gap between the plurality of thin plate seal pieces 20 has flowing conditions that make floating easy.

The detailed structure of the high-pressure side plate 23 of the seal segment 11 of the present embodiment will be described with reference to FIGS. 4 to 6.

Figure 4:
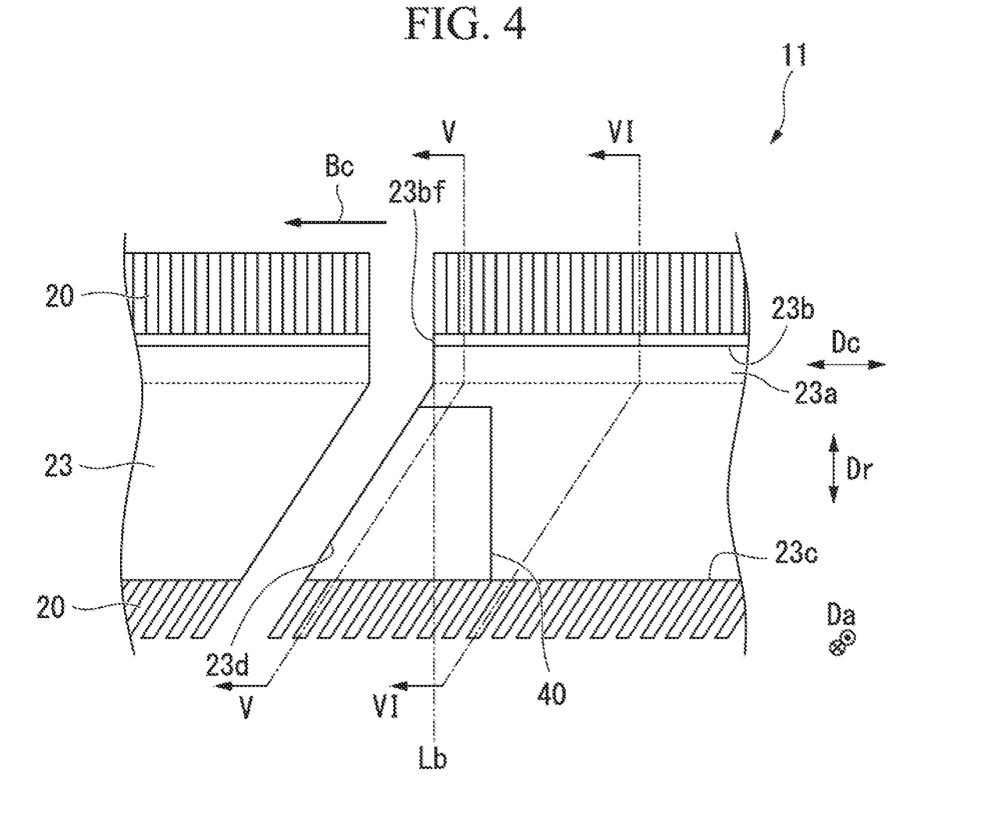
FIG. 4 is a side view of essential parts of the seal segment according to the first embodiment of the present invention as seen from an axial direction.

FIG. 4 shows only the plurality of thin plate seal pieces 20 and the high-pressure side plate 23 of each seal segment 11, for convenience of explanation.

Figure 5:
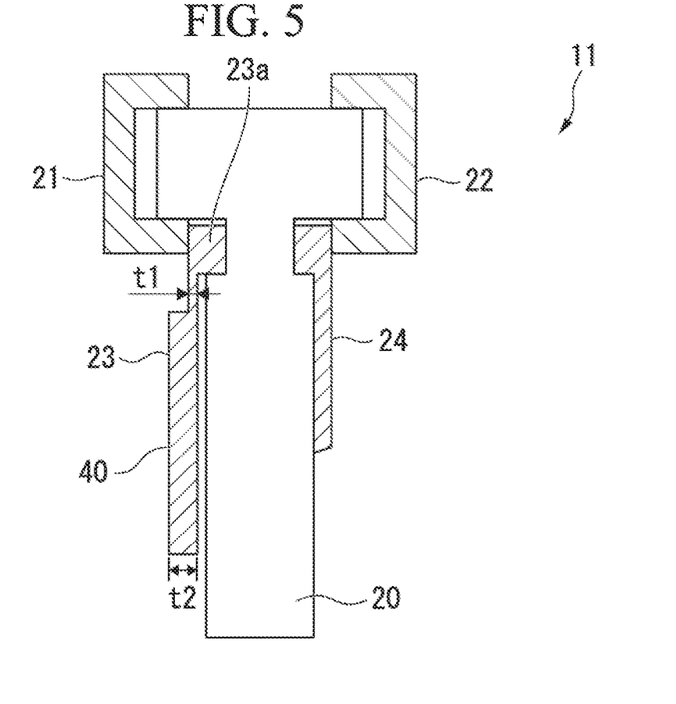
FIG. 5 is a cross-sectional view taken along the line V-V in FIG. 4.
Figure 6:
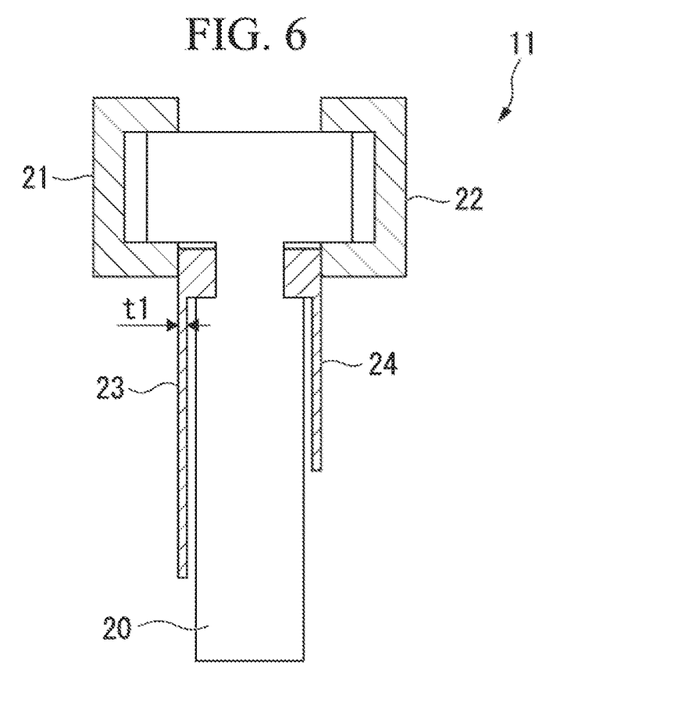
FIG. 6 is a cross-sectional view taken along the line VI-VI in FIG. 4.

On the other hand, FIGS. 5 and 6 show the plurality of thin plate seal pieces 20, the retainers 21, 22, the high-pressure side plate 23 and the low-pressure side plate 24 of each seal segment 11.

As shown in FIG. 4, the high-pressure side plate 23 extends in the radial direction Dr and the circumferential direction Dc to cover the high-pressure side surfaces of the plurality of thin plate seal pieces 20 as described above. Further, the high-pressure side plate 23 has an outer diameter side edge portion 23b which is an edge portion on the outer side in the radial direction Dr and extends in a circular arc shape in the circumferential direction Dc, and an inner diameter side edge portion 23c which is an edge portion on the inner side in the radial direction Dr and extends in a circular arc shape in the circumferential direction Dc.

Further, the high-pressure side plate 23 has a front edge portion 23d which is an edge portion on the front side in the rotational direction Bc, extends forward in the rotational direction Bc from the outer diameter side edge portion 23b toward the inner side in the radial direction Dr. and is connected to the inner diameter side edge portion 23c.

Although it is not shown in FIG. 4, the low-pressure side plate 24 also extends in the radial direction Dr and the circumferential direction Dc to cover the high-pressure side surfaces of the plurality of thin plate seal pieces 20 as described above. Furthermore, the low-pressure side plate 24 also has an outer diameter side edge portion which is an outer edge portion in the radial direction Dr and extends in a circular arc shape in the circumferential direction Dc, and an inner diameter side edge portion which is an inner edge portion in the radial direction Dr and extends in a circular arc shape in the circumferential direction Dc.

Further, the low-pressure side plate 24 also has a front edge portion which is a front edge portion in the rotational direction Bc, extends forward in the rotational direction Bc from the outer diameter side edge portion toward the inner side in the radial direction Dr, and is connected to the inner diameter side edge portion.

The high-pressure side plate 23 further includes a thick plate portion 40 as a reinforcing portion. The thick plate portion 40 is provided to extend rearward in the rotational direction Bc from the front edge portion 23d side and straddle a boundary line Lb only in a region on the front side of the high-pressure side plate 23 in the rotational direction Bc. Further, the boundary line Lb of the present embodiment is defined as a line segment extending from an end portion 23bf of the outer diameter side edge portion 23b on the front side in the rotational direction Bc toward the inner diameter side edge portion 23c along the radial direction Dr.

In the present embodiment, as shown in FIGS. 4 and 5, the thick plate portion 40 is provided from the inner side of the fitting stepped portion 23a in the radial direction Dr to the inner diameter side edge portion 23c in the radial direction Dr.

The thick plate portion 40 has a plate thickness thicker than the plate thickness on the rear side in the rotational direction Bc, and extends rearward in the rotational direction Bc from the front edge portion 23d side to straddle the boundary line Lb.

Therefore, the high-pressure side plate 23 is provided with the thick plate portion 40 only in the region on the front side of the high-pressure side plate 23 in the rotational direction Bc.

On the other hand, as shown in FIGS. 4 and 6, the high-pressure side plate 23 has a plate thickness smaller than that of the thick plate portion 40 in a region on the rear side of the thick plate portion 40. Therefore, the high-pressure side plate 23 is configured with a small plate thickness in a region on the rear side of the thick plate portion 40, and is easily brought into close contact with the side surface 20c of the thin plate seal piece 20.

As shown in FIGS. 5 and 6, a plate thickness $t2$ of the thick plate portion 40 is greater than a plate thickness $t1$ around the thick plate portion 40.

The operation and effect of the high-pressure side plate 23 provided with the thick plate portion 40 will be described.

As described above, the high-pressure side plate 23 is held by the plurality of thin plate seal pieces 20 and the retainer 21.

It is hard for the portion of the high-pressure side plate 23 on the front side in the rotational direction Bc to come into close contact with the side surface 20c of the plurality of thin plate seal pieces 20. Further, since the portion of the high-pressure side plate 23 on the front side in the rotational direction Bc from the boundary line Lb does not have a fitting stepped portion 23a, the portion is not held by the retainer 21 or the plurality of thin plate seal pieces 20.

Therefore, when the entire high-pressure side plate 23 is made of a plate having a small plate thickness to easily come into close contact with the side surface 20c of the thin plate seal piece 20, fluttering easily occurs in the portion of the high-pressure side plate 23 on the front side in the rotational direction Bc from the boundary line Lb.

In the present embodiment, only in the region of the high-pressure side plate 23 on the front side of the high-pressure side plate 23 in the rotational direction Be, the thick plate portion 40 having a large thickness is provided to extend to the rear side in the rotational direction Bc from the front edge portion 23d side and to straddle the boundary line Lb. Therefore, only the region of the high-pressure side plate 23 on the front side in the rotational direction Bc is reinforced so that rigidity increases.

On the other hand, since the region on the rear side in the rotational direction Bc from the reinforced region of the high-pressure side plate 23 is formed by a plate having a small thickness to easily come into close contact with the side surface 20c of the plurality of thin plate seal pieces 20, the adherence performance of the high-pressure side plate 23 is maintained.

Therefore, since the sealing performance of the thin plate seal piece 20 can be maintained, the seal segment 11 hardly affects sealing characteristics and can suppress fluttering.

In the present embodiment, since the reinforcement is performed using the rigidity of the thick plate portion, the rigidity can be adjusted by the thickness and the area of the thick plate portion. Therefore, it is possible to easily adjust the rigidity of the reinforcing portion.

In the present embodiment, the length in the circumferential direction Dc of the region on the front side in the rotational direction Be of the high-pressure side plate 23 on which the thick plate portion 40 is provided is set to three times or less of a distance from the point on which the inner diameter side edge portion 23c is connected to the front edge portion 23d to the boundary line Lb. For example, the length may be about two times. However, as long as the sealing performance of the thin plate seal piece 20 is maintained and fluttering can be suppressed, it is not limited to three times or less.

The thick plate portion 40 of the present embodiment includes the front edge portion 23d and extends rearward from the front edge portion 23d in the rotational direction Bc. However, as a modified example, the thick plate portion 40 may have a configuration which does not include the front edge portion 23d. That is, the thick plate portion may be provided to straddle the boundary line Lb from the rear side of the front edge portion 23d in the rotational direction Be and from the front side of the boundary line Lb in the rotational direction Bc.

In the present embodiment, the thick plate portion 40 is formed in the radial direction Dr from the inner side of the fitting stepped portion 23a in the radial direction Dr to the inner diameter side edge portion 23c.

As a modified example, the thick plate portion 40 may be provided over the entire radial direction Dr except the fitting stepped portion 23a.

As another modified example, the thick plate portion 40 may be provided over the entire radial direction Dr including the fitting stepped portion 23a.

In the thick plate portion 40 of the present embodiment, the plate thickness is constant from the rear side to the front side in the rotational direction Be.

As a modified example, the thick plate portion 40 having a constant plate thickness may be provided via a gradually increasing portion in which the plate thickness gradually increases from the rear side to the front side in the rotational direction Bc.

As another modified example, the plate thickness of the thick plate portion 40 itself may be formed not to be constant, but to gradually increase from the rear side to the front side in the rotational direction Bc.

Second Embodiment

Hereinafter, a second embodiment of the present invention will be described with reference to FIG. 7.

The seal segment of the present embodiment is basically the same as the first embodiment, but a structure of the reinforcing portion of the high-pressure side plate is different.

A detailed structure of a high-pressure side plate 123 of a seal segment 111 of the present embodiment will be described with reference to FIG. 7.

Figure 7:
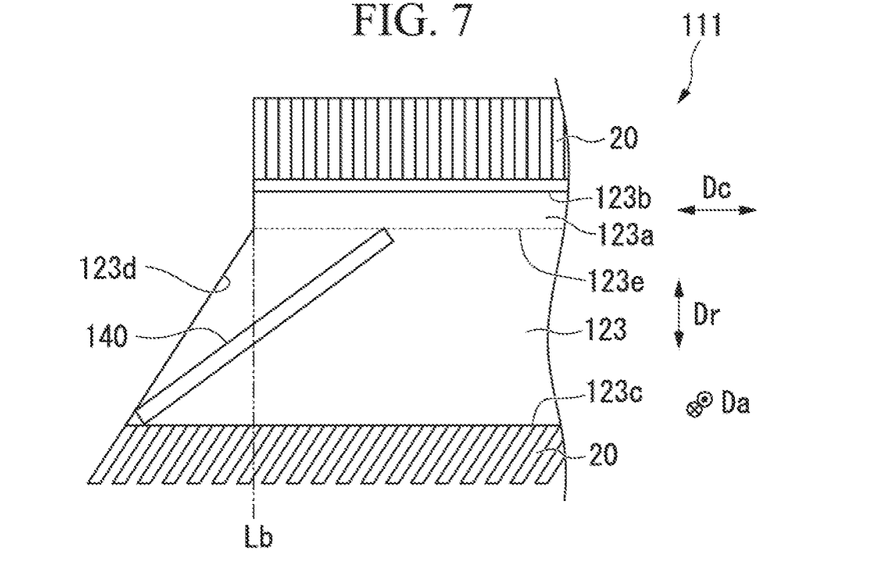
FIG. 7 is a side view of essential parts of a seal segment according to a second embodiment of the present invention as seen from the axial direction.

FIG. 7 shows only the plurality of thin plate seal pieces 20 and the high-pressure side plate 123 of each seal segment 111, for convenience of explanation.

The high-pressure side plate 123 includes a rib structure 140 as a reinforcing portion. The rib structure 140 has a single rod shape and can be attached to the main surface of the high-pressure side plate 123 by welding, brazing or the like. When it is attached by welding, brazing or the like, the rib structure 140 can be provided even when the high-pressure side plate 123 itself is formed. If the rib structure 140 is provided when the high-pressure side plate 123 itself is formed, the rib structure 140 may be integrally formed on the main surface of the high-pressure side plate 123.

The rib structure 140 is provided to extend from a front edge portion 123d side to the rear side in the rotational direction Bc to straddle the boundary line Lb, only in the region of the high-pressure side plate 123 on the front side in the rotational direction Bc. The boundary line Lb of the present embodiment is defined as a line segment extending from an end portion 123bf of an outer diameter side edge portion 123b on the front side in the rotational direction Bc toward an inner diameter side edge portion 123c along the radial direction Dr.

Furthermore, as shown in FIG. 7, the rib structure 140 of the present embodiment obliquely extends in the circumferential direction Dc from an intersection between the inner diameter side edge portion 123c and the front edge portion 123d to a stepped edge portion 123e on the inner diameter side of a fitting stepped portion 123a on the rear side in the rotational direction Bc.

In the present embodiment, by providing the rib structure 140 on the high-pressure side plate 123, the rigidity of the portion of the high-pressure side plate 123 on the front side in the rotational direction Bc is reinforced to increase. In particular, it is possible to increase the rigidity of the portion of the high-pressure side plate 123 on the front side in the rotational direction Bc along an extending direction of the rod shape of the rib structure 140 and it is possible to suppress fluttering of the high-pressure side plate 123 on the front side in the rotational direction Bc from the boundary line Lb.

In the present embodiment, the length in the circumferential direction Dc of the region on the front side in the rotational direction Bc of the high-pressure side plate 123 on which the rib structure 140 is provided is set to three times or less of the distance from the point on which the inner diameter side edge portion 123c is connected to the front edge portion 123d to the boundary line Lb. For example, the length may be about two times the distance. However, as long as the sealing performance of the thin plate seal piece 20 can be maintained and fluttering can be suppressed, the length is not limited to three times or less.

The rib structure 140 of the present embodiment extends rearward in the rotational direction Bc from the position including the front edge portion 123d. However, as a modified example, the rib structure 140 may be configured to not include the front edge portion 123d. That is, the rib structure 140 may be provided to straddle the boundary line Lb from the rear side of the front edge portion 123d in the rotational direction Bc and from the front side of the boundary line Lb in the rotational direction Bc.

Further, in the present embodiment, the rib structure 140 is provided in the radial direction Dr over the entire radial direction Dr except the fitting stepped portion 123a.

As a modified example, the rib structure 140 may be provided in the radial direction Dr from the inner side of the fitting stepped portion 123a in the radial direction Dr to the inner diameter side edge portion 123c.

As another modified example, the rib structure 140 may be provided in the radial direction Dr over the entire radial direction Dr including the fitting stepped portion 123a.

Third Embodiment

Hereinafter, a third embodiment of the present invention will be described.

A seal segment of the present embodiment is basically the same as that of the second embodiment, but the rib structure is different.

The detailed structure of a high-pressure side plate 223 of a seal segment 211 of the present embodiment will be described with reference to FIG. 8.

Figure 8:
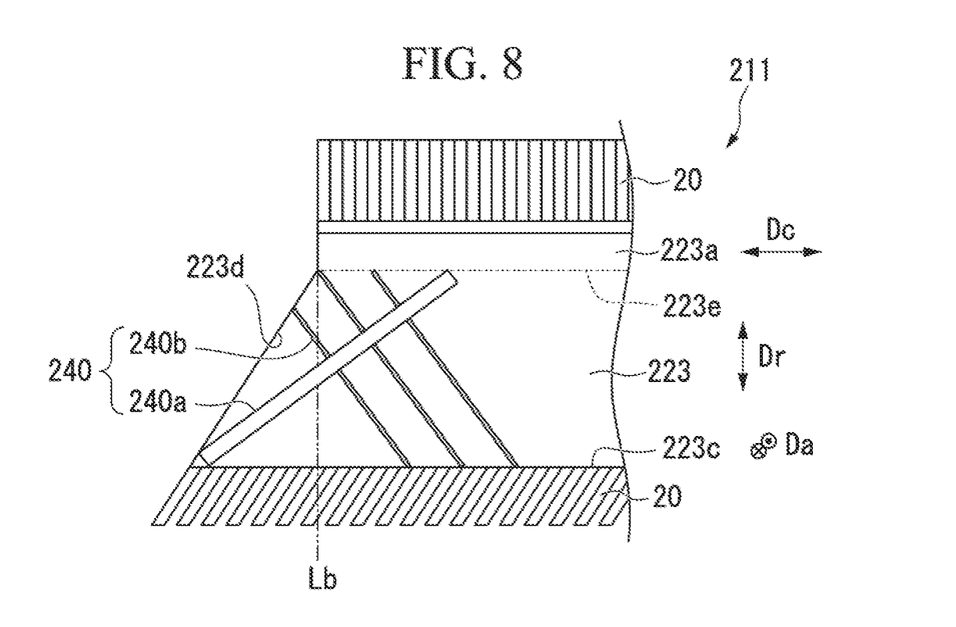
FIG. 8 is a side view of essential parts of a seal segment according to a third embodiment of the present invention as seen from the axial direction.

FIG. 8 shows only the plurality of thin plate seal pieces 20 and the high-pressure side plate 223 of each seal segment 211, for convenience of explanation.

The high-pressure side plate 223 of the present embodiment includes a rib structure 240 as a reinforcing portion. The rib structure 240 includes a main rib portion 240a having a single rod shape, and a plurality of sub rib portions 240b having a rod shape and extending on both sides in the extending direction of the main rib portion 240a.

The main rib portion 240a is provided to extend rearward from a front edge portion 223d side in the rotational direction Bc to straddle the boundary line Lb, only in the region of the high-pressure side plate 223 on the front side in the rotational direction Bc.

Also, the main rib portion 240a extends obliquely with respect to the circumferential direction Dc from the intersection between an inner diameter side edge portion 223c and a front edge portion 223d to a stepped edge portion 223e on the inner diameter side of a fitting stepped portion 223a on the rear side in the rotational direction Bc.

In the present embodiment, one main rib portion 240a and three sub rib portions 240b are provided.

If the main rib portion 240a and the plurality of sub rib portions 240b are provided as the reinforcing portion as in the present embodiment, the rigidity of the portion of the high-pressure side plate 223 on the front side in the rotational direction Bc increases in a plurality of different directions. Furthermore, fluttering in different directions is suppressed.

In the present embodiment, the length in the circumferential direction Dc of the region on the front side in the rotational direction Be of the high-pressure side plate 223 on which the rib structure 240 is provided is set to three times or less of the distance from the point on which the inner diameter side edge portion 223c is connected to the front edge portion 223d to the boundary line Lb. For example, the length may be about two times the distance. However, as long as the sealing performance of the thin plate seal piece 20 can be maintained and fluttering can be suppressed, the length is not limited to three times or less.

As shown in FIG. 8, the rib structure 240 of the present embodiment has a structure in which the sub rib portion 240b passes through and intersects the main rib portion 240a. The main rib portion 240a may be fixed to the main surface of the high-pressure side plate 223 by welding, brazing or the like, or the rib structure 240 may be integrally formed on the main surface of the high-pressure side plate 223.

As a modified example, the main rib portion may be configured to pass through and intersect the sub rib portion. As another modified example, the main rib portion and the plurality of sub rib portions may be integrally formed.

In a case where the main rib portion and the sub rib portion are integrally formed, the rib structure may be fixed to the main surface of the high-pressure side plate by welding, brazing or the like, or the rib structure may be integrally formed on the main surface of the high-pressure side plate.

In the present embodiment, one main rib portion 240a and three sub rib portions 240b are provided.

As a modified example, two sub rib portions 240b or four or more sub rib portions 240b may be provided for one main rib portion 240a.

As another modified example, a rib structure provided with a plurality of main rib portions 240a extending in parallel to the rear side in the rotational direction Be from the front edge portion 223d side and provided to straddle the boundary line Lb, and a sub rib portion 240b extending to intersect the plurality of main rib portions 240a may be provided.

Fourth Embodiment

Hereinafter, a fourth embodiment of the present invention will be described with reference to FIG. 9.

The seal segment of the present embodiment is basically the same as that of the first embodiment, but the structure of the reinforcing portion of the high-pressure side plate is different.

A detailed structure of a high-pressure side plate 323 of a seal segment 311 of the present embodiment will be described with reference to FIGS. 9 and 10.

Figure 9:
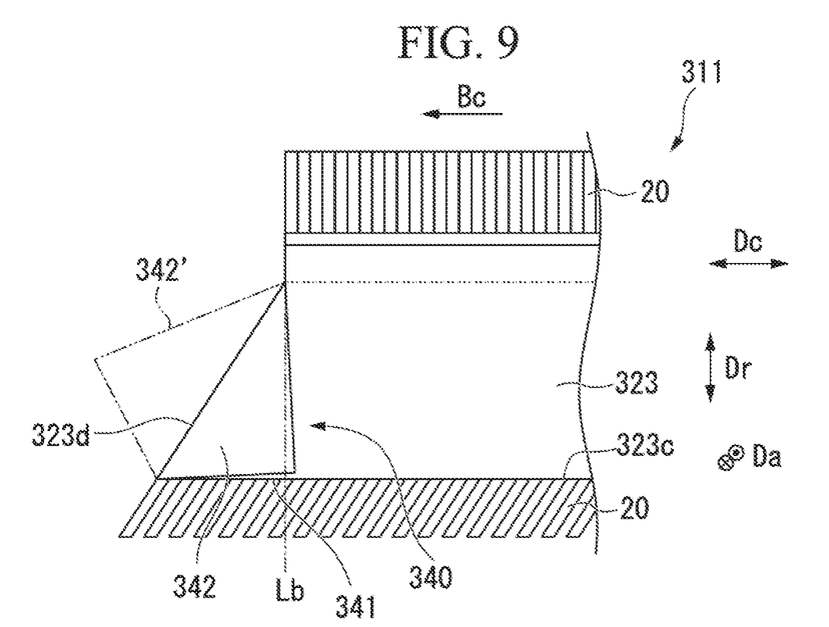
FIG. 9 is a side view of essential parts of a seal segment according to a fourth embodiment of the present invention as seen from the axial direction.

FIG. 9 shows only a plurality of thin plate seal pieces 20 and a high-pressure side plate 323 of the seal segment 311, for the sake of convenience of explanation.

The high-pressure side plate 323 includes a bent plate portion 340 as a reinforcing portion. The bent plate portion 340 is bent so that a part of the bent plate portion 340 and the other part overlap each other from a front edge portion 323d to the boundary line, only in the front region of the high-pressure side plate 323 in the rotational direction Bc.

The specific configuration will be described below.

The bent plate portion 340 includes a superimposed portion 341 formed by a triangular plate surrounded by the boundary line Lb, an inner diameter side edge portion 323c and the front edge portion 323d with the bent front edge portion 323d as a boundary, and a superimposing portion 342 formed by a triangular plate corresponding to the above-mentioned triangular shape.

The bent plate portion 340 of the present embodiment has a shape in which the superimposing portion 342 is bent rearward in the rotational direction Be at the front edge portion 323d. The bent plate portion 340 overlaps such that a triangular surface of the superimposing portion 342 follows a triangular surface of the superimposed portion 341 by bending at the front edge portion 323d.

In the present embodiment, the bent plate portion 340 can be made thin by configuring the bent plate portion 340 by bending at the front edge portion 323d.

By including the bent plate portion 340, the high-pressure side plate 323 is reinforced so that the rigidity of the portion of the high-pressure side plate 323 on the front side in the rotational direction Be increases.

In addition, the bent plate portion 340 of the high-pressure side plate 323 has the following actions depending on an operation (restoring force) of a spring in the bending of the front edge portion 323d.

Figure 3:
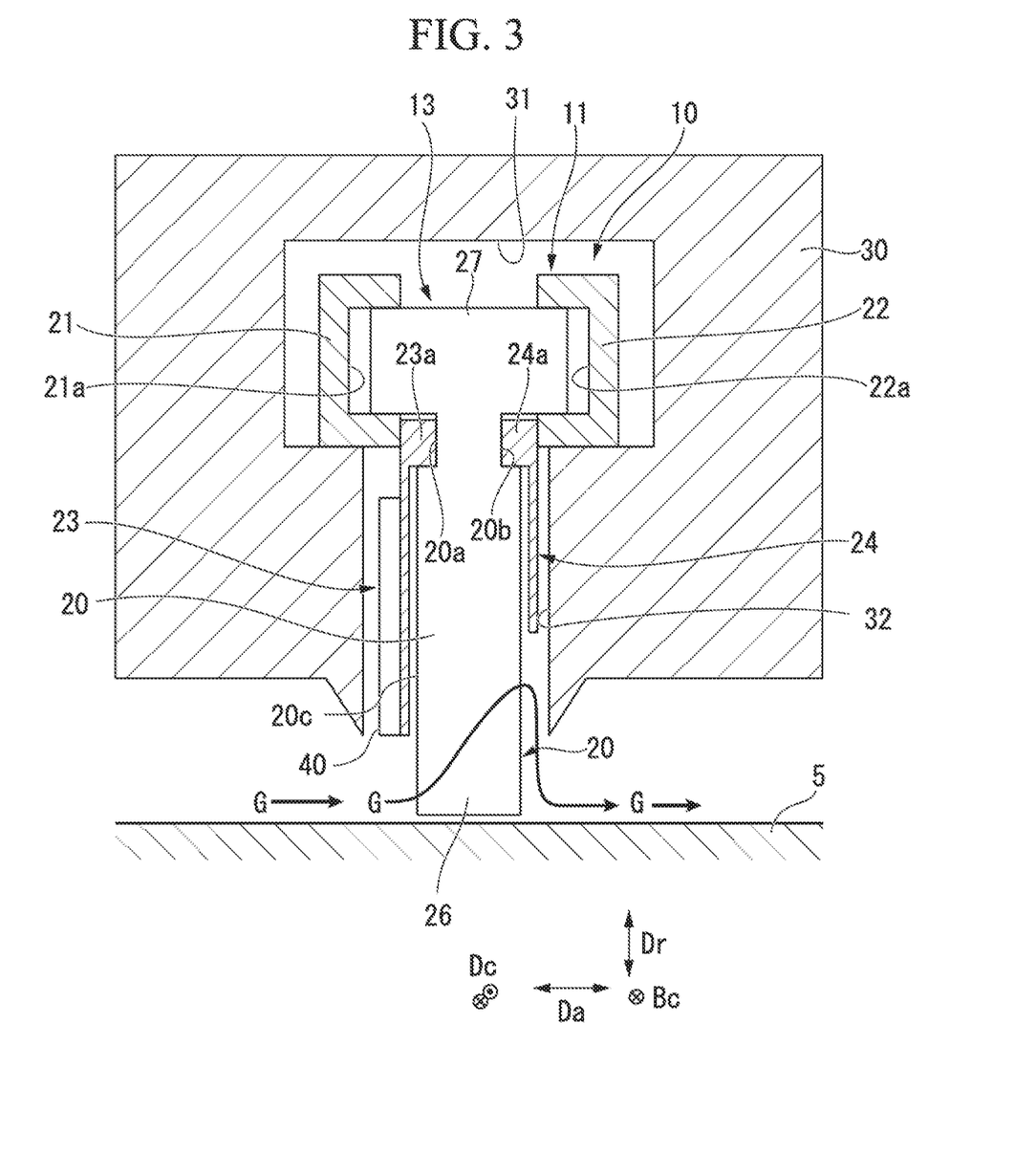
FIG. 3 is a cross-sectional view in a circumferential direction of a seal segment and a housing according to the first embodiment of the present invention.
Figure 10:
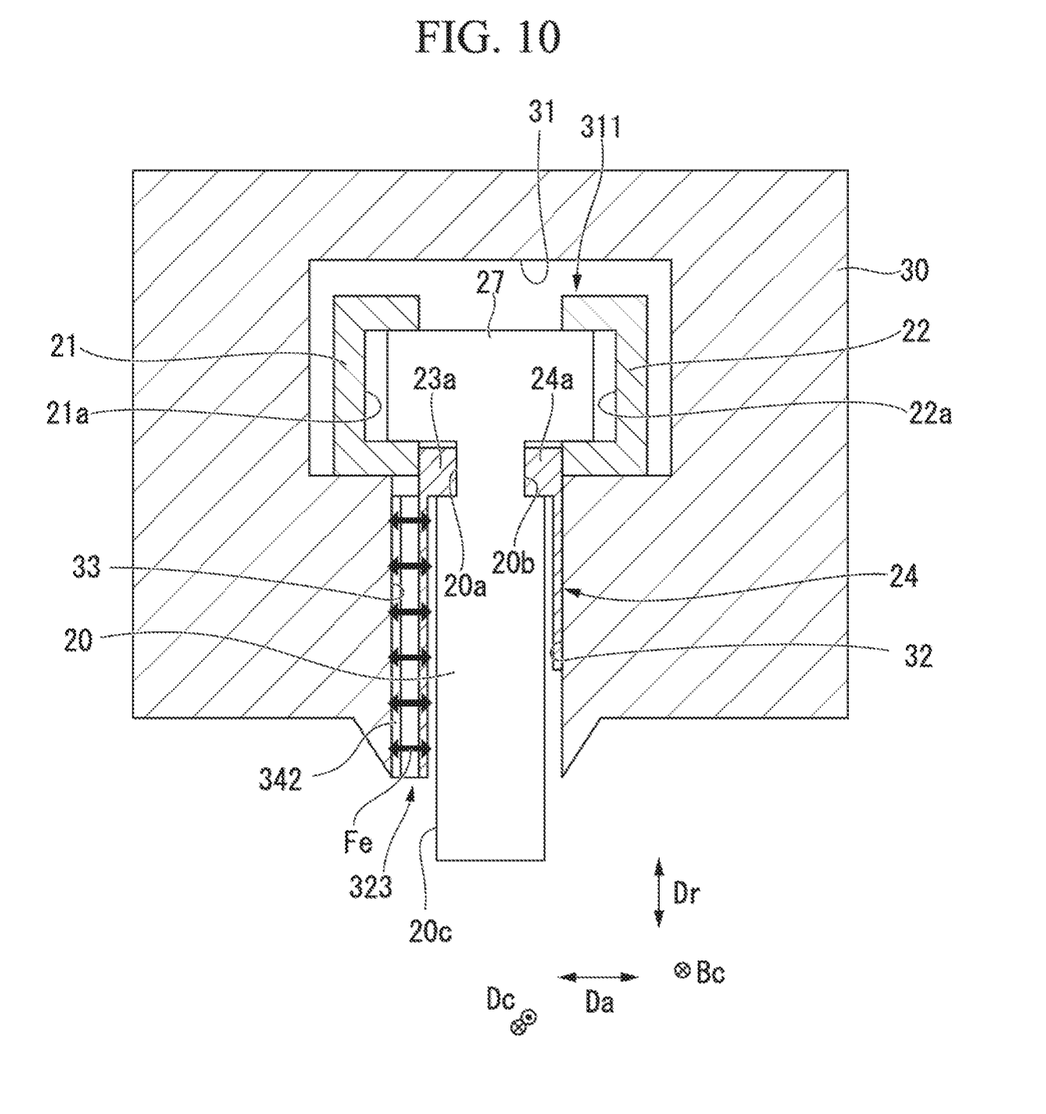
FIG. 10 is a cross-sectional view in the circumferential direction of the seal segment and the housing according to the fourth embodiment of the present invention.

A cut position of the cross-section of the seal segment 311 shown in FIG. 10 is the same position as a cut position of the cross-section of the seal segment 11 shown in FIG. 3.

As shown in FIG. 10, the superimposing portion 342 of the bent plate portion 340 of the high-pressure side plate 323 presses the high-pressure side wall surface 33 of the inner circumferential wall surface of the housing 30, while pressing the superimposed portion 341 of the high-pressure side plate 323 against the side surface 20c of the thin plate seal piece 20. Therefore, it is difficult for the pressed superimposed portion 341 to be deformed, and the rigidity increases.

Furthermore, since the pressed bent plate portion 340 adheres to the side surface 20c of the thin plate seal piece 20, sealing performance is also improved.

Therefore, since the portion of the high-pressure side plate 323 on the front side in the rotational direction Bc is reinforced to increase rigidity and sealing performance is improved, it is possible to suppress fluttering of the high-pressure side plate 323 on the front side in the rotational direction Be from the boundary line Lb.

The bent plate portion 340 having such a bent shape is formed, for example, by bending a surplus portion 342' of FIG. 9 to the rear side in the rotational direction Bc at the front edge portion 323d, but it is also possible to form the bent plate by attaching using welding, brazing or the like.

Although the embodiments of the present invention have been described in detail with reference to the drawings, specific configurations are not limited to the above embodiments, and design changes and the like within the scope not departing from the gist of the present invention are also included.

The number of the seal segments 11 included in the shaft seal device 10 of the present embodiment is eight, but the number may be any one of two to seven, or even nine or more.

In each of the embodiments and modifications, the region of the high-pressure side plate on the front side in the rotational direction is reinforced by the thick plate portion, the rib, and the bent plate, but the region may be reinforced by the combination of the thick plate portion, the rib, and the bent plate.

INDUSTRIAL APPLICABILITY

The sealing segment and the rotary machine described above hardly affect sealing characteristics and can suppress fluttering.

REFERENCE SIGNS LIST

1 Gas turbine
2 Compressor
3 Combustor
4 Turbine
5 Rotor
6 Turbine vane
7 Turbine blade
8 Casing
8a Bearing portion
9 Casing
9a Bearing portion
10 Shaft seal device
11 Seal segment
12 Circumferential end portion
13 Seal body
20 Thin plate seal piece
20a Notched portion
20b Notched portion
20c Side surface
21 Retainer
21a Recessed groove
22 Retainer
22a Recessed groove
23 High-pressure side plate
23a Fitting stepped portion
23b Outer diameter side edge portion
23bf End portion
23c Inner diameter side edge portion
23d Front edge portion
24 Low-pressure side plate
24a: Fitting stepped portion
26 Inner circumferential side end portion
27 Outer circumferential side proximal end
30 Housing
31 Recessed groove
32 Low-pressure side wall surface
33 High-pressure side wall surface
40 Thick plate portion
111 Seal segment
123 High-pressure side plate
123a Fitting stepped portion
123b Outer diameter side edge portion
123bf End portion
123c Inner diameter side edge portion
123d Front edge portion
123e Stepped edge portion
140 Rib structure
211 Seal segment
223 High-pressure side plate
223a Fitting stepped portion
223c Inner diameter side edge portion
223d Front edge portion
223e Stepped edge portion
240 Rib structure
240a Main rib portion 240b Sub rib portion
311 Seal segment
323 High-pressure side plate
323c Inner diameter side edge portion
323d Front edge portion
340 Bent plate portion
341 Superimposed portion
342 Superimposing portion
342' Surplus portion
Ax Axis
Bc Rotational direction
Da Axial direction
Dc Circumferential direction
Dr Radial direction
G Working fluid
Lb Boundary line
t Gap
t1 Plate thickness
t2 Plate thickness

What is claimed is:

1. A seal segment comprising:
a seal body having a plurality of thin plate seal pieces which extend forward in a rotational direction of a rotary shaft toward an inner side of the rotary shaft in the radial direction and are laminated in a partial region of the rotary shaft in a circumferential direction; and
a high-pressure side plate extending in the circumferential direction to cover the seal body from a high-pressure side of the rotary shaft in an axial direction,
wherein the high-pressure side plate includes:
an outer diameter side edge portion which is an outer edge portion in the radial direction and extends in a circular arc shape in the circumferential direction;
an inner diameter side edge portion which is an inner edge portion in the radial direction and extends in a circular arc shape in the circumferential direction; and
a front edge portion which is an edge portion on a front side in the rotational direction, extends to the front side in the rotational direction from the outer diameter side edge portion toward the inner side in the radial direction and is connected to the inner diameter side edge portion,
wherein the high-pressure side plate further includes a reinforcing portion only in a region of the high-pressure side plate on the front side in the rotational direction out of a whole region of the high-pressure side plate, and
wherein the reinforcing portion is provided to extend rearward in the rotational direction from the front edge portion side and straddle a boundary line, when a line segment extending from an end portion of the outer diameter side edge portion on the front side in the rotational direction toward the inner diameter side edge portion in the radial direction is defined as the boundary line.

2. The seal segment according to claim 1, wherein the reinforcing portion includes a thick plate portion provided to extend rearward in the rotational direction from the front edge portion side and straddle the boundary line, only in a region of the high-pressure side plate on the front side in the rotational direction.

3. The seal segment according to claim 1, wherein the reinforcing portion includes a rib structure provided to extend rearward in the rotational direction from the front edge portion side and straddle the boundary line, only in a region of the high-pressure side plate on the front side in the rotational direction.

4. A seal segment comprising:
a seal body having a plurality of thin plate seal pieces which extend forward in a rotational direction of a rotary shaft toward an inner side of the rotary shaft in the radial direction and are laminated in a partial region of the rotary shaft in a circumferential direction; and
a high-pressure side plate extending in the circumferential direction to cover the seal body from a high-pressure side of the rotary shaft in an axial direction,
wherein the high-pressure side plate includes:
an outer diameter side edge portion which is an outer edge portion in the radial direction and extends in a circular arc shape in the circumferential direction;
an inner diameter side edge portion which is an inner edge portion in the radial direction and extends in a circular arc shape in the circumferential direction; and
a front edge portion which is an edge portion on a front side in the rotational direction, extends to the front side in the rotational direction from the outer diameter side edge portion toward the inner side in the radial direction and is connected to the inner diameter side edge portion,
wherein the high-pressure side plate further includes a bent plate portion only in a region of the high-pressure side plate on the front side in the rotational direction out of a whole region of the high-pressure side plate, and
wherein the bent plate portion is provided to extend rearward in the rotational direction from the front edge portion to a boundary line when a line segment extending from an end portion of the outer diameter side edge portion on the front side in the rotational direction toward the inner diameter side edge portion in the radial direction is defined as the boundary line.

5. The seal segment according to claim 4, wherein the bent plate portion is bent to overlap each other from the front edge portion to the boundary line.

6. The seal segment according to claim 4, wherein the bent plate portion is bent at the front edge portion.

7. A rotary machine comprising the seal segment according to claim 1.

8. The seal segment according to claim 2, wherein the reinforcing portion includes a rib structure provided to extend rearward in the rotational direction from the front edge portion side and straddle the boundary line, only in a region of the high-pressure side plate on the front side in the rotational direction.

9. The seal segment according to claim 5, wherein the bent plate portion is bent at the front edge portion.

10. A rotary machine comprising the seal segment according to claim 2.

11. A rotary machine comprising the seal segment according to claim 3.

12. A rotary machine comprising the seal segment according to claim 4.

13. A rotary machine comprising the seal segment according to claim 5.

14. A rotary machine comprising the seal segment according to claim 6.

15. A rotary machine comprising the seal segment according to claim 8.

16. A rotary machine comprising the seal segment according to claim 9.

* * * * *